Feb. 28, 1933.  P. E. YOUNG  1,899,907
APPARATUS FOR BALANCED MOLDING OF RUBBER ARTICLES
Filed Nov. 22, 1930
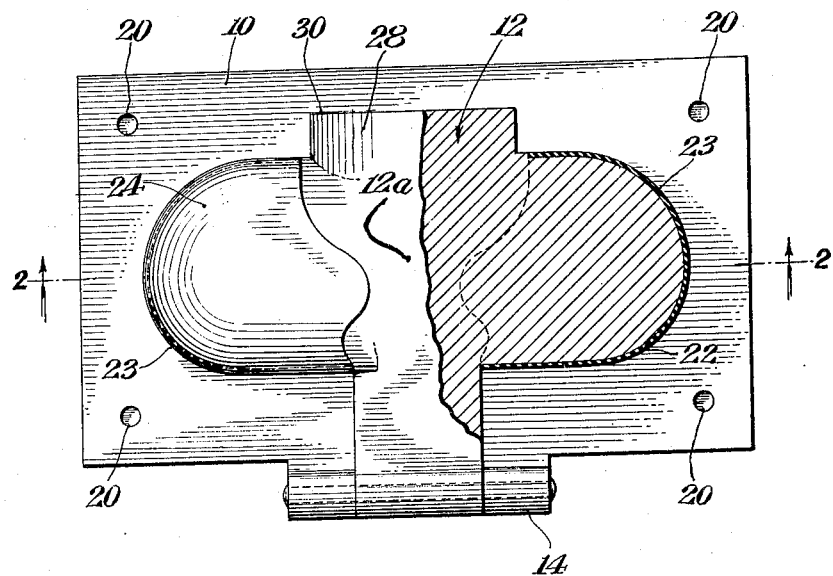
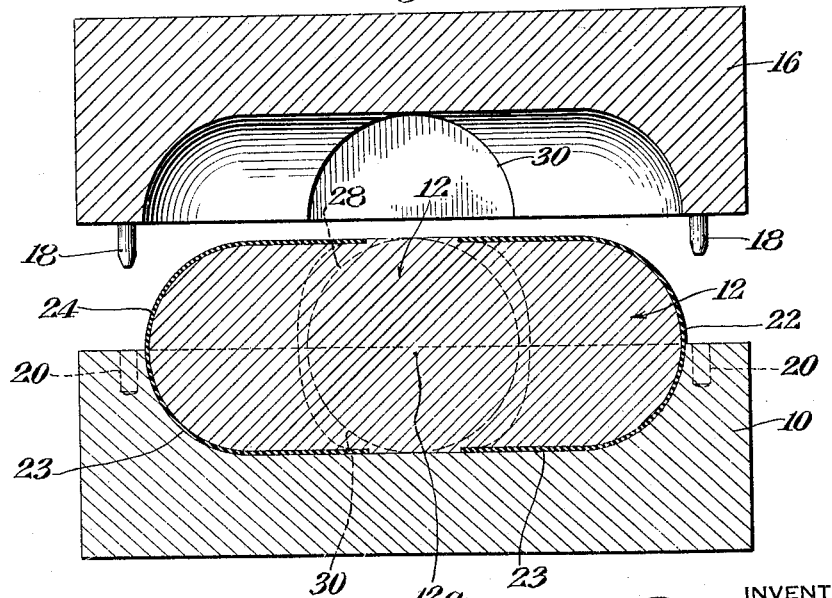
INVENTOR
Philip E. Young
BY
Prindle, Bean & Mann
ATTORNEY Patented Feb. 28, 1933

1,899,907

UNITED STATES PATENT OFFICE

PHILIP E. YOUNG, OF FAIRHAVEN, MASSACHUSETTS, ASSIGNOR TO ACUSHNET PROCESS COMPANY, A CORPORATION OF MASSACHUSETTS

APPARATUS FOR BALANCED MOLDING OF RUBBER ARTICLES

Application filed November 22, 1930. Serial No. 497,408.

This invention relates to a process and equipment for molding articles of rubber which have relatively thin side walls but have an opening of substantial area leading into the interior. Examples of such articles are molded bathing caps and rubber bathing shoes.

Heretofore it has been customary to form such articles by the use of a mold provided with a core about which the compound was placed. Because of the shape of such articles as a bathing cap or shoe, it has not been feasible to form these directly as by using any type of plunger or press to distribute the rubber compound around the mold, and, therefore, the mold must be divided longitudinally, and the compound carefully fitted in the mold, usually in the form of sheets. Thereafter, the mold was closed and subjected to heavy hydraulic pressure. When the rubber softens under the influence of heat during vulcanization, it acts substantially as a fluid so that a tremendous resultant pressure transverse to the direct pressure is generated which ordinarily displaces the core and sometimes the resulting pressures are in the order of 4000 lbs. per square inch. Therefore after a short time it frequently is found that the articles are being formed unduly thick on the side from which the resultant pressure moves. Thus in the case of a bathing cap the article will be formed with too much rubber directly over the top of the head.

I have found that this difficulty can readily be overcome by forming a mold of the type split in a plane substantially parallel to the main axis of the core adapted to produce two similar articles with a single core serving for both articles which are arranged with their openings opposite each other. When this is done, and similar amounts of stock are used for producing similar articles, the indirect pressures developed are equal and opposite so that there is no undue strain on the core tending to displace the same and the molds remain perfect a long period of time. This invention can readily be understood by reference to the accompanying drawing; and comprises essentially a method and apparatus for balancing the resulting pressures in the molding operations described.

Fig. 1 represents a balanced mold partly broken away, with the upper portion removed after a molding operation has been completed, and Fig. 2 is a vertical cross section upon the line 2—2 of Fig. 1, but also showing the top of the mold.

In these figures 10 represents a lower shell portion of a mold adapted to hold a core 12, which latter is pivoted upon a hinge 14 so that it may be raised and lowered. A top shell portion 16 of the mold is designed to unite with the lower portion 10, and the two portions 10 and 16 are guided together evenly by positioning dowel pins 18 which enter corresponding holes 20. The core 12 may be provided with positioning means such as projection 28 which fits into a corresponding slot 30 of the shell wall. Caps 22 and 24 are shown in molding spaces 23 after a molding operation has been completed. These caps are disposed opposite each other relative to the center 12a of the core. It will be noted that the longitudinal axis of the core of each cap is parallel to the dividing line of the two mold portions 10 and 16; and that in the example shown, the single core 12 runs substantially through the two mold cavities, so that only space for the article remains.

In operation, sheeted rubber is cut to shape and fitted into the mold spaces 23 about the core 12. The top shell portion 16 is replaced and the rubber is then subjected to curing processes during which the mold is subjected to heavy hydraulic pressure. The rubber softens, and following substantially the liquid laws, a heavy resultant pressure is exerted towards the open part of the cap, or the core 12. However, molding spaces 23 are balanced substantially equally and equal pressure is therefore maintained on both sides of the core center 12a. The hydraulic pressures practically neutralize each other as far as strains are concerned with relation to the core. The plastic rubber acts on both sides in substantial balance, and even where the article molded may be of uneven design, such as the bathing caps shown, the longitudinal forces balance, though there may be some slight torsional forces from the irregularities of the design. However, these small differences are negligible.

It is to be understood that a greater number of articles may be molded simultaneously by disposing them in substantially balanced relation to the core.

It is to be further understood that the specific embodiment shown is set out solely for the purposes of illustration that my invention is capable of various embodiments within the scope of the appended claims, and that I have disclosed and that I desire to claim an advance in the art of molding hollow rubber articles provided with large openings, comprising forming a mold capable of holding a plurality of the articles and arranging the openings of the articles about the center part of the core, whereby pressure which is given the plastic rubber, which is in turn transmitted to the core, may be substantially counterbalanced in each case by similar rubber articles positioned symmetrically relative the core.

What I claim is:

1. A structure for the molding of hollow molded rubber articles having relatively large openings comprising a shell adapted to mold a plurality of such articles simultaneously and a common integral core for said shell adapted to complement the mold in the molding operation the shell being divided longitudinally and the longitudinal axis of the core being substantially parallel to the longitudinal dividing line of the shell, said shell and said core when in molding position having shaped spaces between them for the molding of the desired articles, said shaped spaces being disposed in substantially balanced relationship relative to said core, whereby the resultant hydraulic pressures generated are substantially balanced.

2. A mold for molding hollow rubber articles having relatively large openings comprising an outer shell longitudinally divided into a plurality of parts forming mold cavities said parts adapted to be united with heavy hydraulic pressures, and a core adapted to be positioned within said shell so that its longitudinal axis is approximately parallel to the division line of the shell, said core and said shell being adapted to complement each other to provide spaces for a plurality of the desired articles and to leave only spaces for the molding of such articles by pressure between the parts of the mold, said spaces being disposed in the mold in a substantially balanced manner with reference to the center of the core whereby resultant hydraulic pressure forces generated against the core substantially counteract one another.

3. A mold for molding hollow rubber articles having relatively large openings comprising an outer shell longitudinally divided into the parts forming mold cavities and adapted to be united by pressure, a core adapted to fit within said mold shell so that a plurality of molding spaces are provided said core substantially filling said cavities and having its main axis parallel to the dividing line of the shell, said molding spaces being disposed about the center of said core in substantially balanced relation whereby resultant pressures generated by closing said mold tend to counteract one another.

In testimony that I claim the foregoing, I have hereunto set my hand this 18th day of November, 1930.

PHILIP E. YOUNG.